(12) United States Patent
Raab et al.

(10) Patent No.: US 7,372,581 B2
(45) Date of Patent: May 13, 2008

(54) THREE-DIMENSIONAL COORDINATE MEASURING DEVICE

(75) Inventors: Simon Raab, Santa Barbara, CA (US); Robert E. Bridges, Kennett Square, PA (US)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 11/402,355

(22) Filed: Apr. 11, 2006

(65) Prior Publication Data
US 2006/0227210 A1 Oct. 12, 2006

Related U.S. Application Data

(60) Provisional application No. 60/670,217, filed on Apr. 11, 2005.

(51) Int. Cl.
*G01B 11/14* (2006.01)
(52) U.S. Cl. .................................. 356/614
(58) Field of Classification Search ............... None
See application file for complete search history.

(56) References Cited

U.S. PATENT DOCUMENTS

| | | | |
|---|---|---|---|
| 5,235,416 A | 8/1993 | Stanhope | 358/101 |
| 5,440,392 A | 8/1995 | Pettersen et al. | |
| 5,481,361 A | 1/1996 | Yumiki et al. | |
| 5,530,549 A | 6/1996 | Brown | |
| 5,825,666 A | 10/1998 | Freifeld | |
| 5,920,394 A | 7/1999 | Gelbart et al. | 356/375 |
| 5,973,788 A | 10/1999 | Pettersen et al. | |
| 6,044,569 A | 4/2000 | Ogihara et al. | |
| 6,166,809 A | 12/2000 | Pettersen et al. | 356/375 |
| 6,175,647 B1 * | 1/2001 | Schick et al. | 382/154 |
| 6,285,959 B1 | 9/2001 | Greer | 702/95 |
| 6,825,937 B1 | 11/2004 | Gebauer et al. | |

(Continued)

FOREIGN PATENT DOCUMENTS

| | | |
|---|---|---|
| EP | 1447644 | 8/2004 |
| WO | WO 9857121 | 12/1998 |

OTHER PUBLICATIONS

PCT Search Report—PCT/US2006/013560.
English Abstract for Publication No. JP 09068409.

*Primary Examiner*—Tu T Nguyen
(74) *Attorney, Agent, or Firm*—Cantor Colburn LLP

(57) ABSTRACT

An optical camera three-dimensional coordinate measuring system for use with objects to be measured is described. The system may include a compact, easily moveable, and rotatable, target of known dimensions comprising a spherical surface to be placed in contact with the object to be measured at different points along the object to be measured thereby eliminating the necessity of using a larger extended probe contact tip extending from the target to the object to be measured. At least one or more light emitting source may be located in a known position in the target such as the center of the spherical surface for example. At least two cameras located at different and known coordinate locations for receiving light from the light emitting source from different optical perspectives may be included. The position in three dimensional coordinates of the object to be measured is computed from the images taken by the cameras.

19 Claims, 11 Drawing Sheets

U.S. PATENT DOCUMENTS

| | | | |
|---|---|---|---|
| 6,973,202 B2 * | 12/2005 | Mostafavi | 382/103 |
| 7,075,661 B2 * | 7/2006 | Petty et al. | 356/603 |
| 2001/0027381 A1 | 10/2001 | Kikuchi et al. | |
| 2003/0184765 A1 | 10/2003 | Gurny | |
| 2004/0145746 A1 | 7/2004 | Kim et al. | |
| 2005/0012056 A1 | 1/2005 | Leikas | |

* cited by examiner

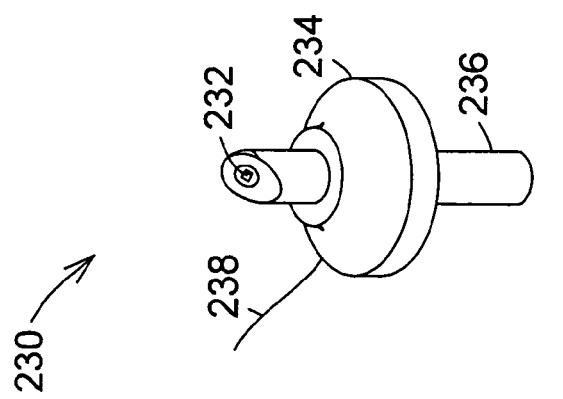
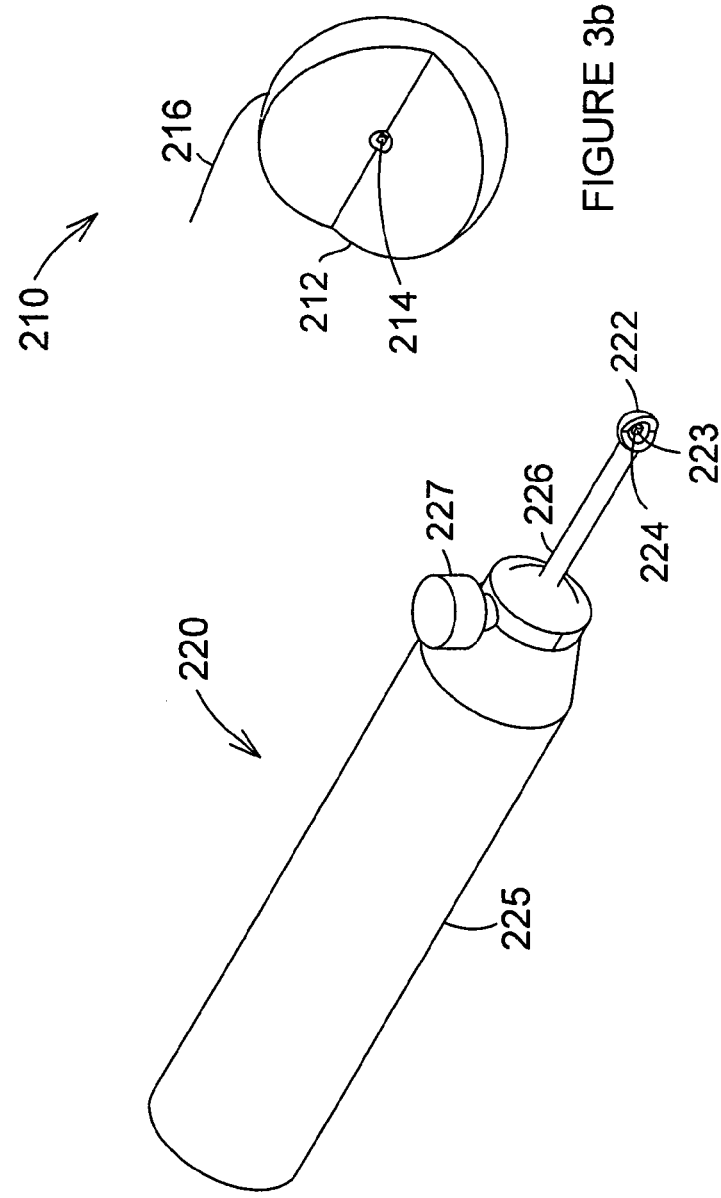

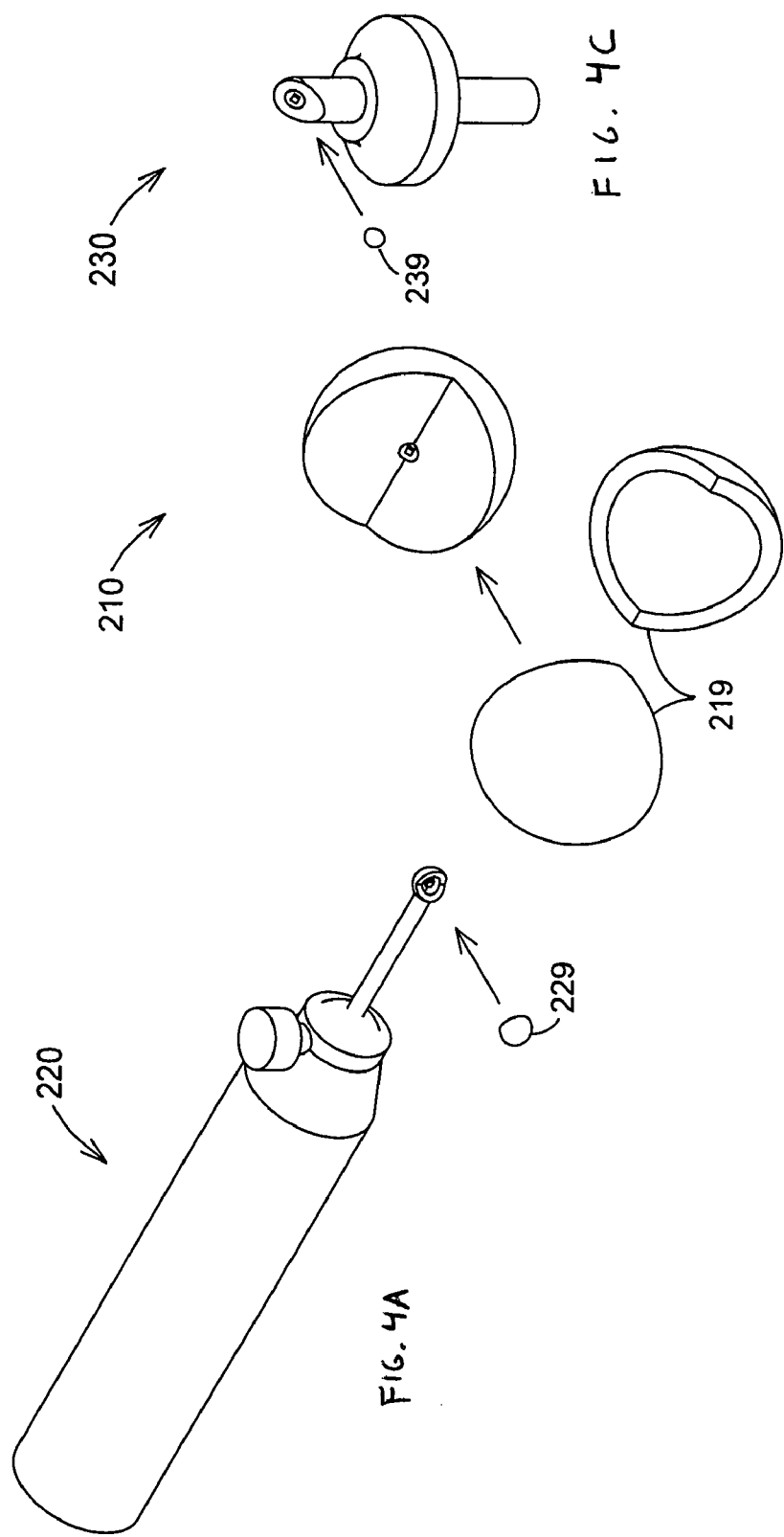

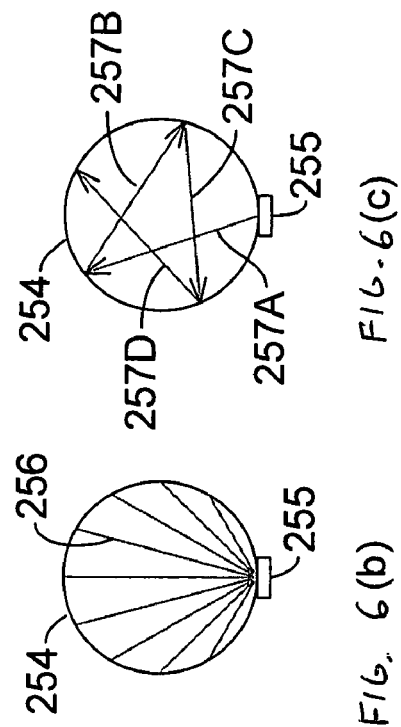
FIG. 6(c)
FIG. 6(b)
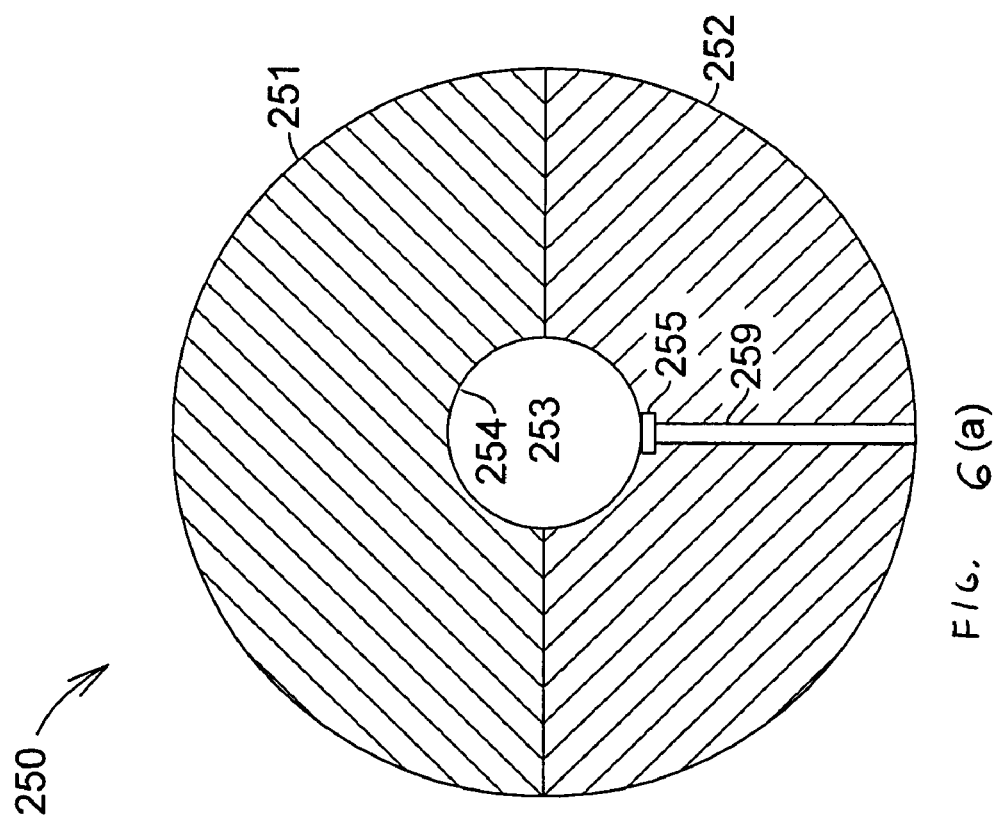
FIG. 6(a)

THREE-DIMENSIONAL COORDINATE MEASURING DEVICE

CROSS REFERENCE

This application claims the benefit of priority to U.S. Provisional Patent Application Ser. No. 60/670,217, filed Apr. 11, 2005, the entire contents of which are specifically incorporated herein by reference.

BACKGROUND

There is a class of portable devices that accurately measure three-dimensional coordinates to a range of several tens of meters. Such devices are ordinarily referred to as portable large-scale coordinate-measuring machines (CMMs). One type of portable CMM is the laser tracker. It sends a laser beam to a retroreflector target, which may be a spherically mounted retroreflector (SMR) comprising a cube-corner retroreflector centered within a sphere that is moved over the surface of interest. Alternatively the target may be a retroprobe, which comprises a cube-corner retroreflector positioned near a mirror to form a virtual image of a probe tip (U.S. Pat. No. 5,530,549).

A second category of portable CMM is the camera and multiple-light probe (U.S. Pat. No. 5,440,392). This device comprises a probe, which contains a probe tip and at least three point sources of light, together with one or more cameras that view the point sources of light. The image pattern on the camera is used to determine the position of the probe tip in space.

A third category of portable CMM is the laser tracker with a separate but nearby camera. (U.S. Pat. No. 5,973,788). This device comprises the laser tracker, a camera mounted near the laser tracker, and a probe. The probe comprises a probe tip, at least three point sources of light, and a retroreflector. A laser beam from the laser tracker measures the three-dimensional coordinates of the retroreflector. At the same time, the camera measures the three-dimensional coordinates of the light sources on the probe. The information from these measurements allows the coordinates of the probe-tip in space to be determined. A related idea (U.S. Pat. No. 5,973,788) is to embed the camera into a laser tracker that also contains an absolute distance meter.

Four attributes are desirable in a portable CMM: (1) low price, (2) high accuracy, (3) rapid data collection, and (4) ease-of-use. Today the least expensive of these devices costs nearly $100,000. Some devices collect data too slowly to be used to efficiency determine the coordinates of three-dimensional contours. Other devices have relatively poor accuracy. There is a need today for a new type of instrument that is fast, accurate, and much less expensive than current portable CMMs.

Some advantages of the present three-dimensional coordinate measuring device compared to prior art are discussed herein, however this is not intended to be a limiting or exhaustive listing of advantages. There are several companies that make camera-based metrology systems. One of the highest accuracy Metronor systems uses two cameras, which can be placed on a factory floor for example. In this respect, the Metronor system is like the present device. However, the Metronor system is based on a probe with a tip that is not illuminated. The find the location of this tip, the Metronor system must be capable of accurately determining the pitch, roll, and yaw angles of the probe from the camera images of multiple LEDs located on the probe. To make possible the required accuracy, Metronor makes their probes large enough to cover a relatively large fraction of the field of view of the cameras. Such large probes are cumbersome to manage. Furthermore, the probes need to be stiff and fixed in length over temperature, which means using expensive composite materials.

In most cases a different kind of probe such as the embodiments described below which are not currently used by any camera-based system, would be more useful, convenient, and cost effective than an extended probe such as Metronor's. The simplest such device—the sphere with a light source placed at its center—takes advantage of the fact that the distance from the center to the edge of a sphere is a constant. Thus, the sphere body acts like a spacer of known dimensions between the object to be measured and the light source. Also, the sphere can be turned in any direction. Because of this fact, the spherically mounted light source can be used to measure the contour of almost any object. In some cases, a handle will be also convenient. A similar idea from symmetry leads to the fiducial target, which will typically be put into a pre-established tooling hole. In this case, the light source is located on the rotational axis of symmetry of the target. By measuring the target, it is therefore possible to determine the three-dimensional coordinate of the hole on the tool.

One thing that all of the targets—sphere, probe-mount, fiducial, wide-angle, or retroprobe target—have in common is that all emit light over a wide angle from a single point in space. All of the prior art camera-based probes use multiple points of light. Thus, it has not been obvious to those skilled in the art that such useful and accurate probes could be devised based on a single point-of-light. Proof of this fact is that people have been making camera-based metrology systems for years and that no one has yet implemented such as system, which arguably can be made less expensively and with equal or higher accuracy.

SUMMARY OF INVENTION

An optical camera three-dimensional coordinate measuring system for use with objects to be measured may comprise a compact, easily moveable, and rotatable, target of known dimensions comprising a spherical surface to be placed in direct contact with the object to be measured at different points along the object to be measured thereby eliminating the necessity of using a larger extended probe contact tip extending from the target to the object to be measured; at least one or more light emitting source located in a known position in the target and wherein the light emitting source is located at the spherical center of the target having a spherical surface; at least two cameras located at different and known coordinate locations for receiving light from the light emitting source from different optical perspectives; and a processor for computing the position in three dimensional coordinates of the object to be measured from images of the light emitting source on the cameras, from the known positions of the cameras, from the known dimensions of the target, and from the known position of the light emitting source in the target.

Another embodiment, may comprise a Coordinate Measurement Machine (CMM) for use with objects to be measured comprising: a spherical or cylindrical shaped geometric target of known dimensions to be placed in contact with the object to be measured at different points along the object to be measured; at least one or more light emitting diode (LED) light source located at a point of symmetry on the spherical or cylindrical shaped geometric target; at least two photosensitive cameras located at different and known coordinate locations for receiving light from the light emitting diode (LED) light source from different optical perspectives; a processor for computing the position in three dimensional coordinates of the object to be measured from images of the light emitting diode (LED) light source recorded on the cameras, from the known positions of the cameras, from the known dimensions of the spherical or cylindrical shaped geometric target, and from the known position of the light emitting source located in the spherical or cylindrical geometric target; wherein the at least two cameras each include at least one or more photosensitive arrays which are used to determine coordinates of the object to be measured from the recorded images of the light emitting diode (LED) light source on the photosensitive arrays that the light from light emitting diode (LED) light source is incident upon.

Another embodiment may comprise an optical camera three-dimensional coordinate measuring method for measuring objects comprising: placing a compact, easily moveable, and rotatable, target of known dimensions comprising a spherical surface in direct contact with the object to be measured at different points along the object to be measured thereby eliminating the necessity of using a larger extended probe contact tip extending from the target to the object to be measured; emitting light from the target form at least one or more light emitting source located in a known position in the target; recording images of the light source at least two cameras located at different and known coordinate locations for receiving light from the light emitting source from different optical perspectives; and computing the position in three dimensional coordinates of the object to be measured from images of the light emitting source on the cameras, from the known positions of the cameras, from the known dimensions of the target, and from the known position of the light emitting source in the target.

Another embodiment may be an optical camera three-dimensional coordinate measuring system for use with objects to be measured comprising: a compact, easily moveable, and rotatable, target of known dimensions comprising a cylindrical surface to be placed in at least one or more holes in the object to be measured thereby eliminating the necessity of using a larger extended probe contact tip extending from the target to the object to be measured; at least one or more light emitting sources wherein the light emitting source is located at a known position along an axis of cylindrical symmetry; at least two cameras located at different and known coordinate locations for receiving light from the light emitting source from different optical perspectives; and a processor for computing the position in three dimensional coordinates of the object to be measured from images of the light emitting source on the cameras, from the known positions of the cameras, from the known dimensions of the target, and from the known position of the light emitting source in the target.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIGS. 3A, 3B, and 3C are perspective views of three embodiments of exemplary emitter of FIG. 2; and FIGS. 4A, 4B, and 4C are perspective views of transparent spherical shell segments that may be affixed to the three emitter embodiments shown in FIG. 3 to protect the light sources from dust and dirt; FIGS. 6A, 6B, and 6C show sectional views of the emitter ball within the wide-angle emitter and the path of light rays within the spherical cavity of the emitter ball.

DETAILED DESCRIPTION OF EXEMPLARY EMBODIMENTS

Figure 1:
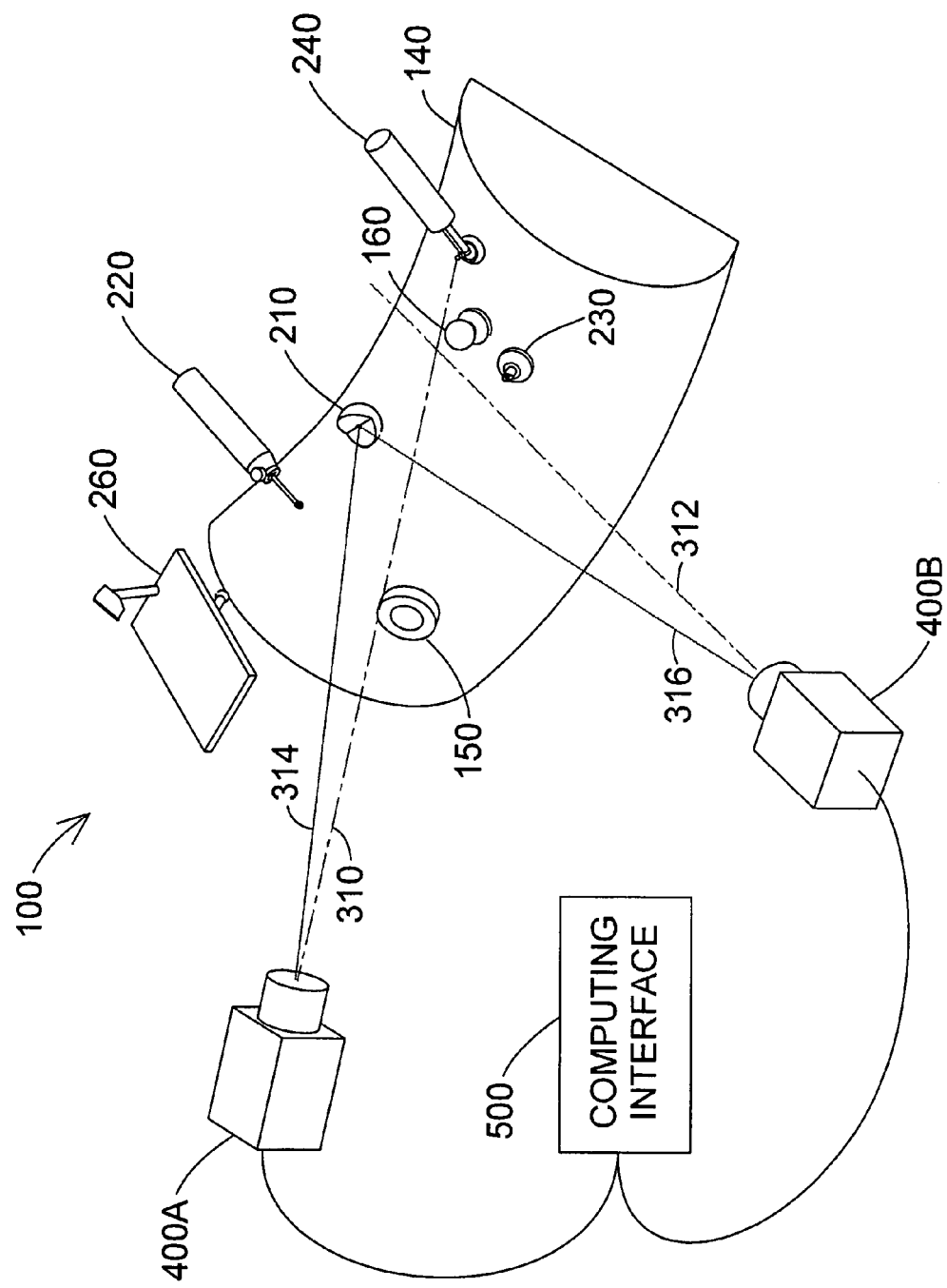
FIG. 1 is a perspective view of an exemplary three-dimensional measuring device.

Three-dimensional coordinate measuring device 100 shown in FIG. 1 comprises two or more cameras 400A, 400B, computing interface 500, and emitter 200, which may be implemented as spherically mounted emitter 210, probe mounted emitter 220, fiducial emitter 230, wide-angle emitter 240, or retroprobe emitter 260.

Emitter

Figure 2:
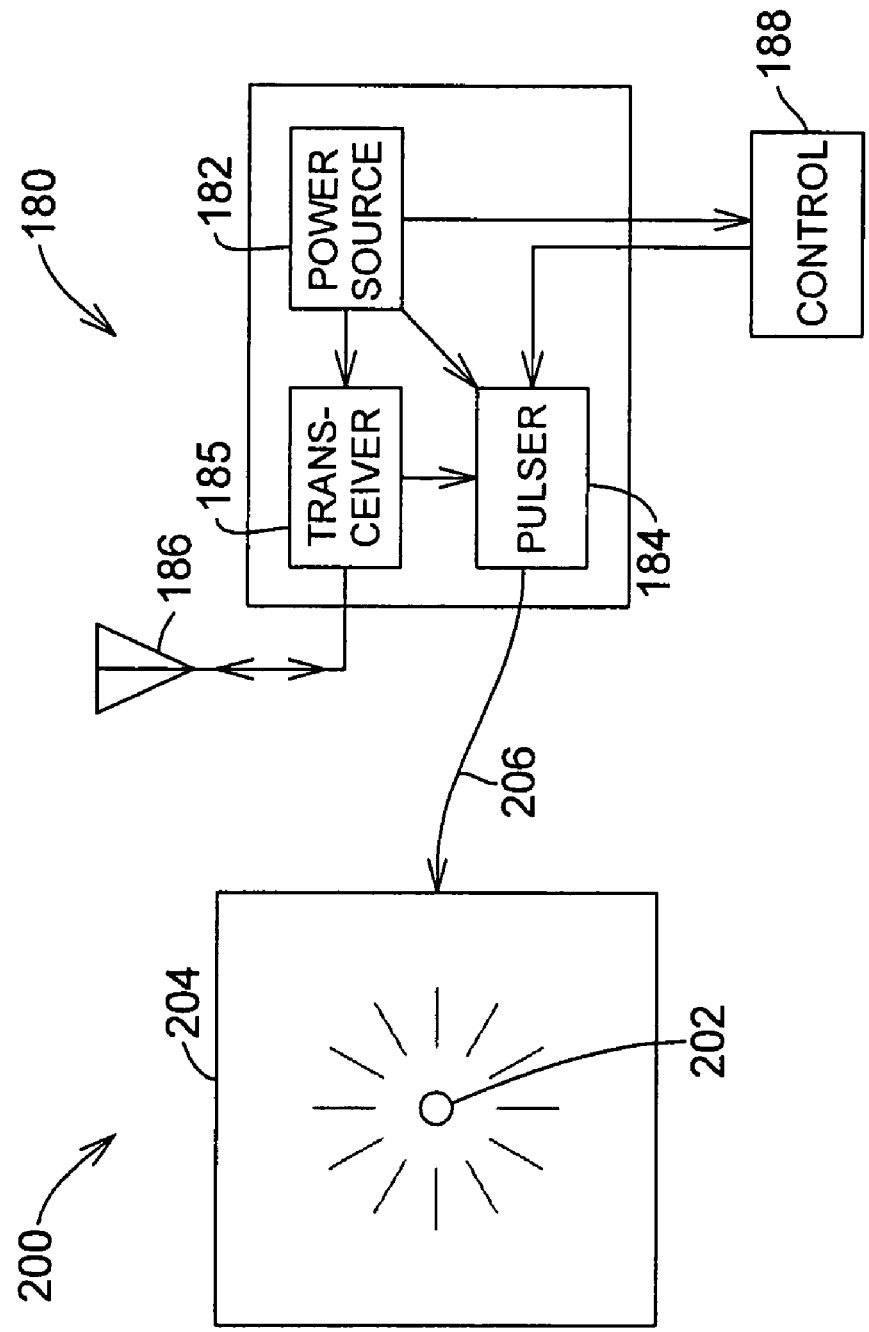
FIG. 2 is a block diagram of some of the main elements within the exemplary emitter of FIG. 1.

As shown in FIG. 2, emitter 200 comprises light source 202, rigid probe structure 204, and wire 206. The light source preferably emits light over a broad angle from a small spot in space. An example of a light source is a wide-angle light emitting diode (LED) but the invention is not limited to LED light sources as any suitable light source may be used.

Electronic signaling means 180 comprises power source 182, pulser 184, transceiver 185, antenna 186, and operator control unit 188. Power source 182 may be a battery or a plug for AC power. Pulser 184 sends an electronic signal over wire 206 that causes light source 202 to flash. The timing, duration, and intensity of pulses generated by pulser 184 may be controlled in one of three ways: (1) by a signal received through antenna 186, (2) by a signal initiated when the operator presses a button on operator control unit 188, or (3) by a predetermined signal pattern. Electronic signaling means 180 may be embedded within rigid probe structure 204, carried by the operator, or put on the floor. Antenna 186 intercepts electromagnetic energy such as radio frequency (RF) or infrared energy. As an alternative embodiment, antenna 186 may be replaced by a wire connected to a computing device or remote control unit.

FIG. 3 shows three embodiments of emitter 200: spherically mounted emitter 210, probe mounted emitter 220, and fiducial emitter 230. Spherically mounted emitter 210 comprises partial sphere 212, light source 214, and wire 216. Partial sphere 212 is a sphere in which a segment has been removed. It is preferably made of steel so that it can be held in place by a magnetic nest. Light source 214 is positioned in the center of partial sphere 212. Wire 216 connects light source 214 to electronic signaling means 180 (shown in FIG. 2).

Probe mounted emitter 220 comprises small partial sphere 222, light source 223, wire 224, probe body 225, rotating shaft 226, and locking mechanism 227. Light source 223 is positioned in the center of small partial sphere 222. Wire 224 connects light source 223 to electronic signaling means 180 (shown in FIG. 2), which preferably is enclosed within probe body 225. Power source 182 preferably is a battery and operator control unit 188 preferably is integrated into probe body 225. Rotating shaft 226 can be turned through a range of angles and locked into place with locking mechanism 227.

Fiducial emitter 230 comprises light source 232, crown 234, shank 236, and wire 238. Light source 232 is positioned along the cylindrical axis of symmetry of shank 236 and crown 234. Shank 236 sits inside a fiducial tooling hole that is formed in object 140. The bottom of crown 234 makes contact with the surface of the object 140. Light source 232 is positioned so that it sits a fixed distance above the surface of object 140. Wire 238 connects light source 232 to electronic signaling means 180.

Portable large-scale CMMs are often used in dirty industrial environments where particulate matter is scattered throughout the air. If a particle settles over one of the light sources in the emitters of FIG. 3, it may partially or totally block the light from the light source. To avoid this problem, a symmetrical transparent cover can be centered over the light source. An optional attachment to spherically mounted emitter 210 is transparent spherical shell segment 219 shown in FIG. 4. Spherical shell segment 219 is drawn in normal and reversed view to show the internal structure of the shell. The spherical surfaces of spherical shell segment 219 are centered on the center of spherical surface 212 shown in FIG. 3. Light emitted by light source 214 then travels in straight rays through spherical shell segment 219. Spherical shell segment 229 is optionally attached to spherically mounted probe 220 and spherical shell segment 239 is optionally attached to fiducial emitter 230.

Figure 5:
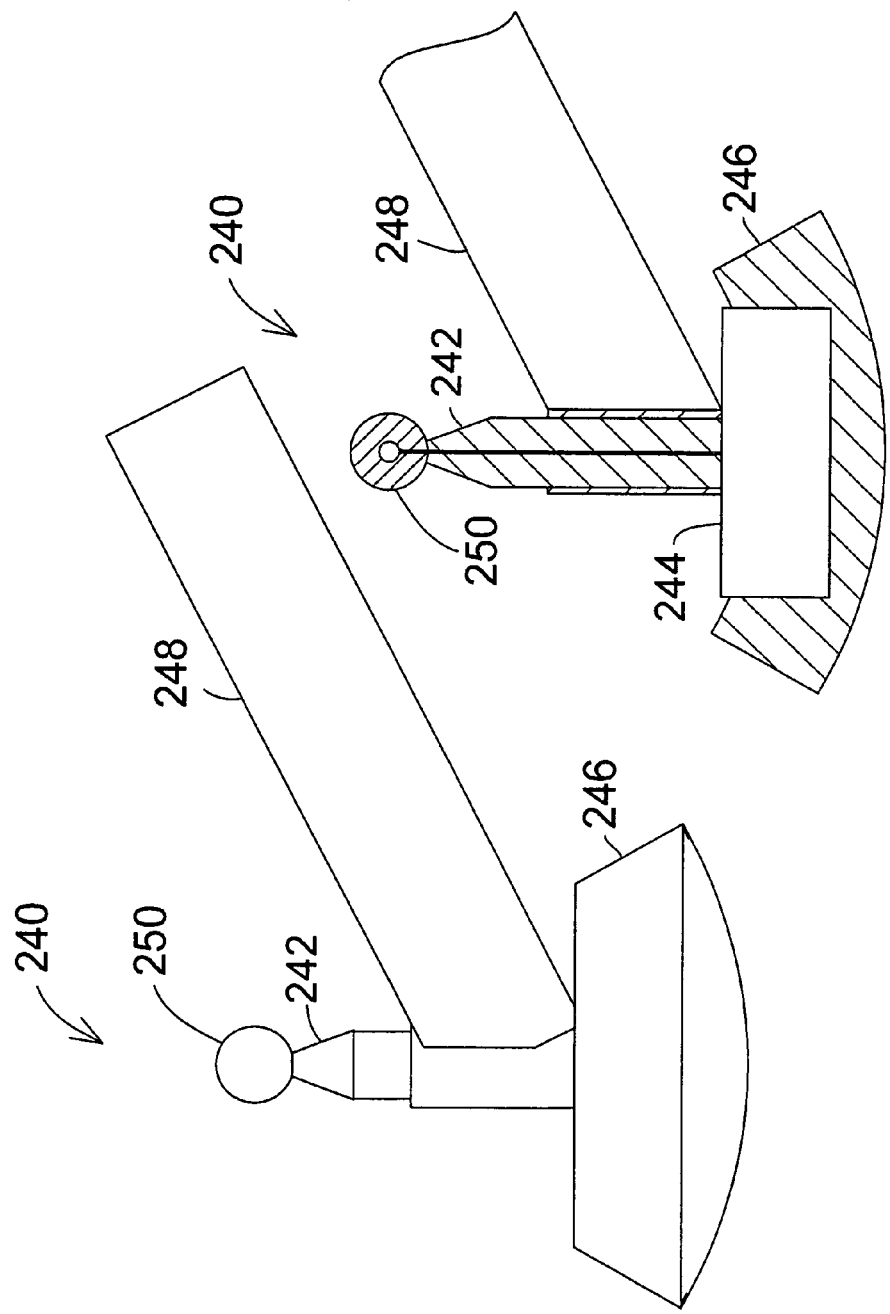
FIG. 5 shows a side view and a cross-sectional view of exemplary spherically mounted wide-angle emitter.

A fourth embodiment of emitter 200 is the wide-angle emitter 240, shown in perspective view in FIGS. 1 and 5 and in cross-sectional view through the center of the emitter in FIG. 5. Wide-angle emitter 240 comprises emitter ball 250, shaft 242, electronics cavity 244, spherical base segment 246, and optional handle 248. The intensity of light from wide-angle emitter 240 is nearly the same in all directions. Emitter ball 250 is centered on the lower surface of spherical base segment 246. In other words, the distance from the center of emitter ball 250 to the outer surface of spherical base segment 246 is equal to the radius of spherical base segment 246.

Emitter ball 250, shown in central cross section in FIG. 6(*a*), comprises upper transparent hemispherical shell 251, lower transparent hemispherical shell 252, and wide-angle light source 255. Upper and lower hemispherical shells 251 and 252 are joined together with index-matching cement to form hollow spherical cavity 253. Spherical cavity 253 is covered with a coating 254 comprising multiple thin layers of hard dielectric material that transmits a small fraction of the light from the light source, say one or two percent, and reflects the rest of the light with very little loss. Wide-angle light source 255 is mounted near the bottom of spherical cavity 253. Electrical wires attached to the light source are routed through opening 259 drilled into lower hemispherical shell 252.

FIG. 6(*b*) depicts the rays of light 256 that emerge from wide-angle light source 255. For a wide-angle light source in the form of a light-emitting diode (LED), the emitted light typically has a half-power full angle of about 120 degrees. The wide angular spread of light from light source 255 is shown in FIG. 6(*b*). Because the surface of cavity 253 is coated to be highly reflective, only a small amount of light passes through transparent hemispherical shells 251 and 252. Most of the remaining light is reflected except for a small amount that is absorbed. FIG. 6(*c*) shows how a particular ray of light 257A reflects as rays off the surface of cavity 253 in the following order: 257B, 257C, and 257D. The reflections continue until all of the light has been transmitted through hemispherical shells 251 and 252 or absorbed by the glass or coating. The rays of light 257A, 257B, 257C, 257D, and so forth cover widely spaced points on the surface of spherical cavity 253. After reflection, the rays 256 will be dispersed over the surface of spherical cavity 253. As a result of the wide-angular spread of light from light source 255 and the high reflectance of light from dielectric coating 254, the power of the light source light per unit area is nearly constant over the surface of spherical cavity 253. Furthermore, the light rays do not in general strike the surface of cavity 253 at normal incidence. As a result, the light transmitted through cavity surface 253 are refracted in all different directions with respect to the incident beam and again refracted at all different directions by the outer surfaces of hemispherical shells 251 and 252. To cameras 400A and 400B, emitter ball 251 appears as a diffusely illuminated circle having a diameter equal to that of the spherical cavity 253. The position of the centroid of the illuminated cavity 253 when viewed from the position of either camera will be nearly the same as the geometrical center of the cavity. There will be some slight variation in the position of the centroid as emitter ball 250 is tilted with respect to the cameras.

To obtain the most accurate measurements with wide-angle emitter 240, the diameter of cavity 253 should be made as small as practical; a diameter of 1 mm is reasonable. In addition, dielectric coating 254 should be designed to have high reflectance with low loss at the light source wavelength. If the transmittance per pass is 1% and the reflectance is nearly 99%, then the variation in optical power per unit area over the surface of the cavity is small. Using these techniques, it should be possible to build a wide-angle emitter that operates over an angular field-of-view of 230 or 240 degrees with an error in centroid position of not more than about 10 micrometers over the range of angles. Wide-angle emitter 240 is advantageous when multiple cameras are stationed to view a target over a variety of angles. This measurement situation is discussed below. Electronics and battery for wide-angle emitter 240 may be stored in electronics cavity 244 or in handle 248. Alternatively electronics and power may be provided by a wire from a remote location.

Figure 7:
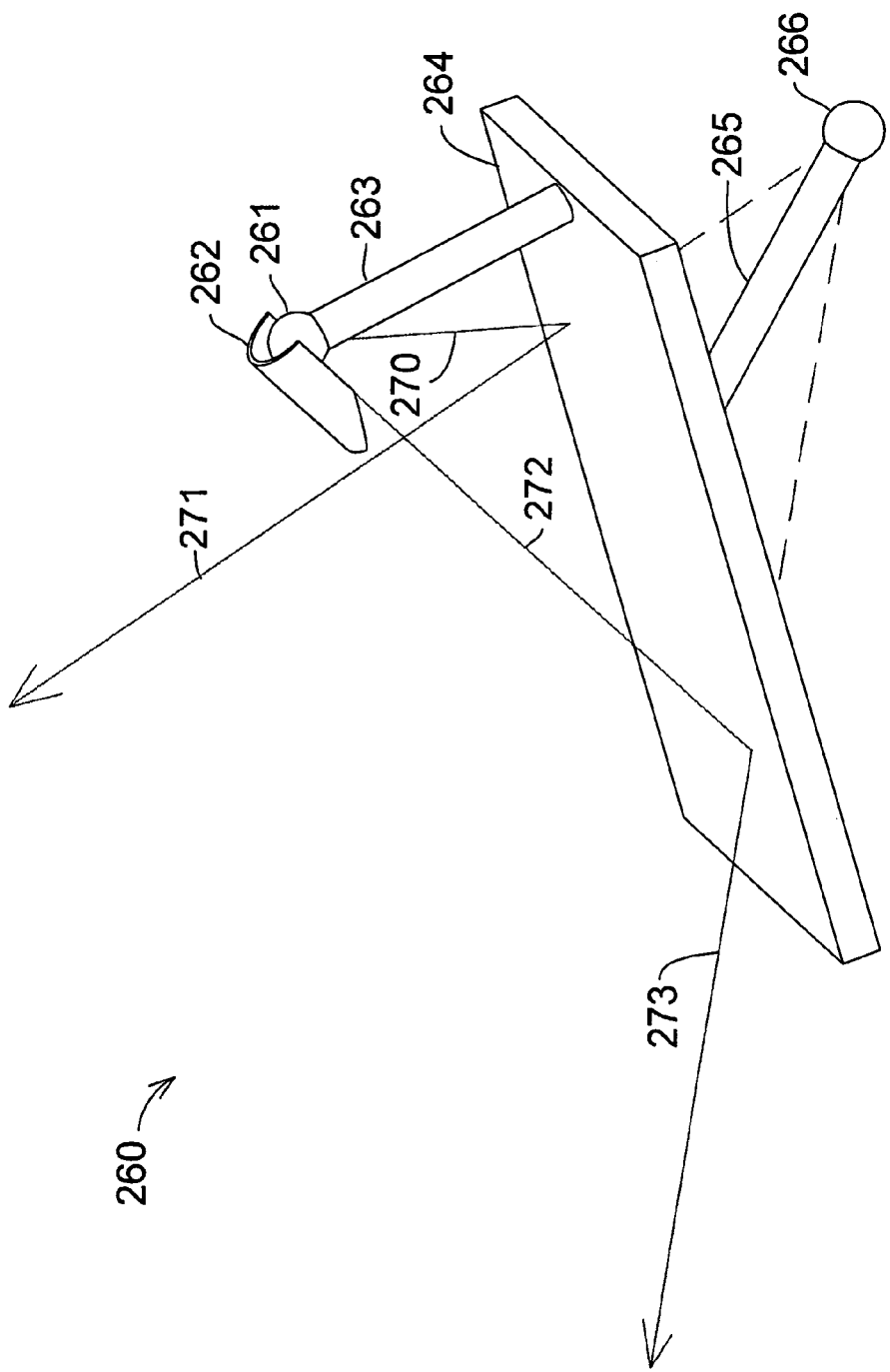
FIG. 7 shows a perspective view of exemplary retroprobe emitter.

A fifth embodiment of emitter 200 is the retroprobe emitter 260, shown in perspective view in FIGS. 1 and 7. Retroprobe emitter 260 comprises light source 261, baffle 262, light source support 263, mirror 264, probe shaft 265, and probe tip 266. Light beam 270 emanates from light source 261, reflects off mirror 264, and travels as light beam 271 to camera 400A. Light beam 272 emanates from light source 261, reflects off mirror 264, and travels as light beam 273 to camera 400B. Probe tip 266 is located at the position of the virtual image of light source 261 formed by mirror 264. In other words, a line drawn between probe tip 266 and light source 261 bisects the reflecting surface of mirror 264 in a right angle. Baffle 262 blocks light from light source 261 from directly reaching camera 400A or 400B. The cameras therefore see the light source as emanating from point 266.

This configuration is advantageous because probe tip 266 can reach points for which a light source is not visible to both cameras 400A, 400B.

Camera

Figure 8:
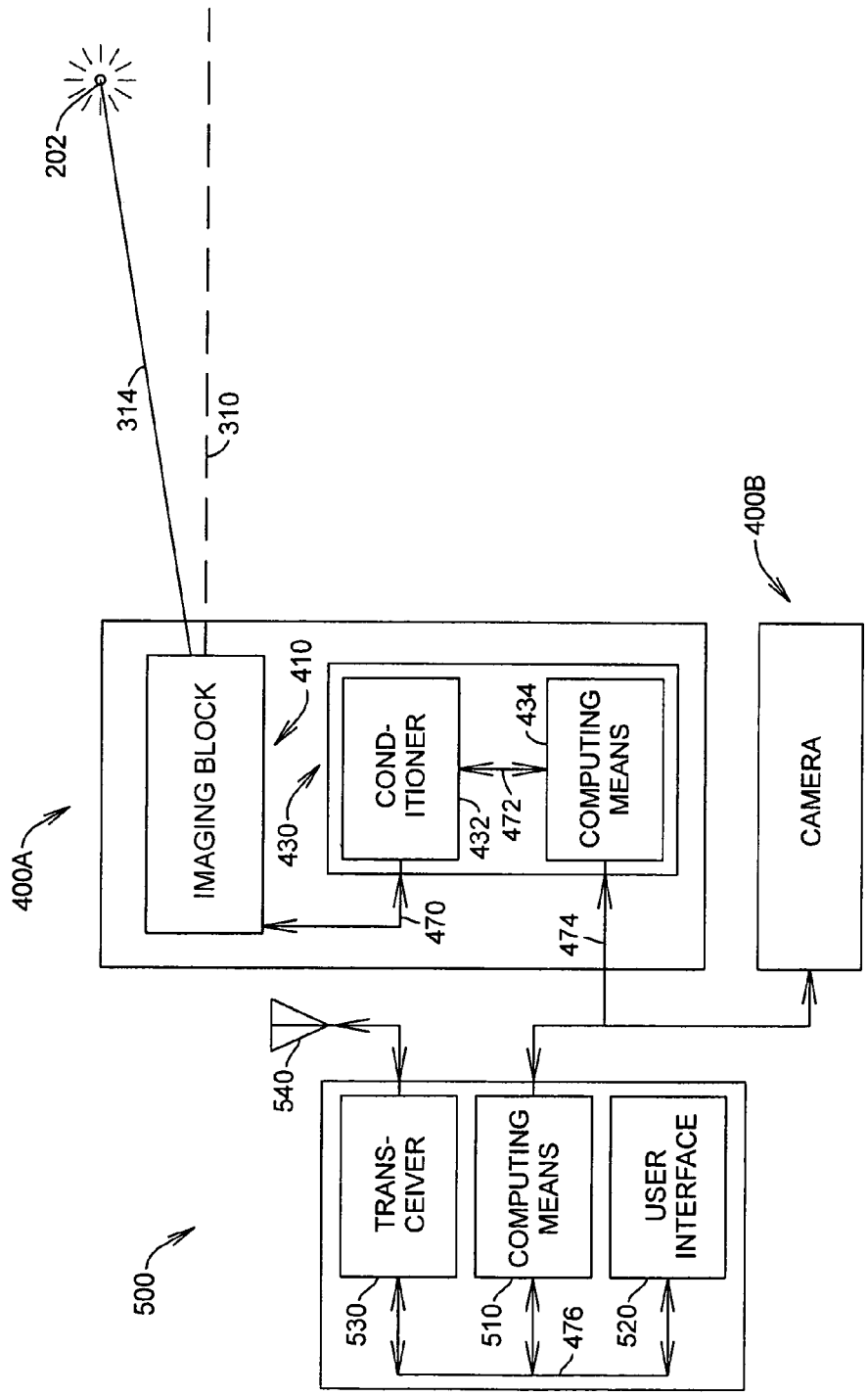
FIG. 8 is a block diagram of some of the main elements of the cameras within the system.

A block diagram of camera 400A, which is identical to camera 400B, is shown in FIG. 8. Camera 400A comprises imaging block 410 and electrical block 430. There are two embodiments of imaging block 410. The first embodiment is linear imaging block 800 shown in FIG. 9. Linear imaging block 800 comprises optical bandpass filter 814, beam splitter 816, first and second apertures 820A, 820B, first and second cylindrical lens assemblies 830A, 830B, and first and second linear photosensitive arrays 840A, 840B. The purpose of optical bandpass filter 814 is to eliminate background light outside the wavelength range of light source 202. This improves the signal-to-noise ratio of photosensitive array 840A, 840B. An alternative to optical bandpass filter 814 is to coat the surfaces of first and second lens assemblies 830A, 830B to filter out unwanted wavelengths.

Figure 9:
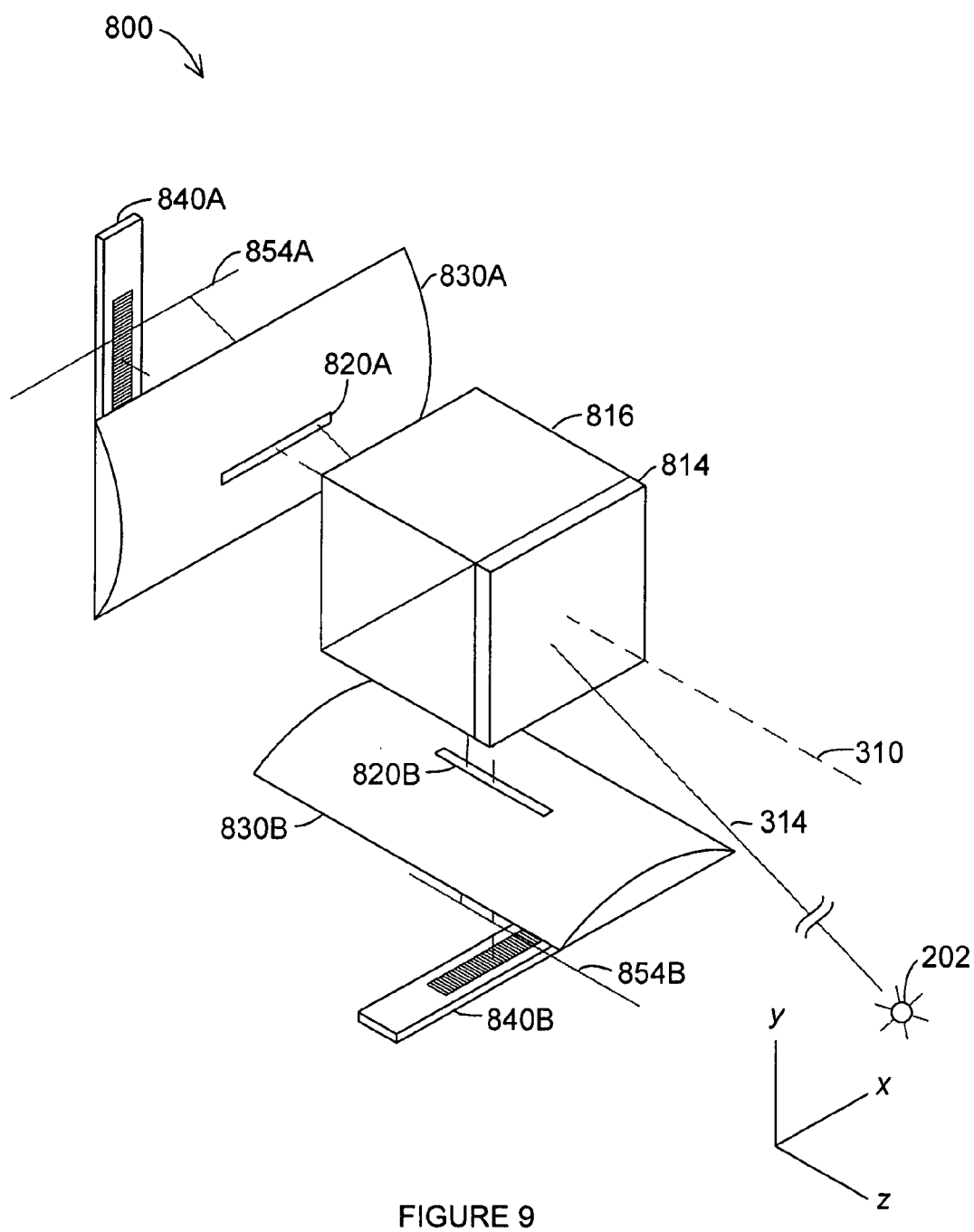
FIG. 9 is a perspective view of the a first embodiment of the imaging block within the cameras wherein the images are formed with a beam splitter, cylindrical lenses, and linear photosensitive arrays.

Optical axis 310 goes through the centers of beam splitter 816, first aperture 820A, first cylindrical lens assembly 830A, and first linear photosensitive array 840A. The reflection of optical axis 310 off of beam splitter 816 goes through the centers of second aperture 820B, second cylindrical lens assembly 830B, and second linear photosensitive array 840B. Light ray 314 emerges from source of light 202 and travels to linear imaging block 800, as shown in FIG. 9. First aperture 820A permits only some of the light to enter the first cylindrical lens assembly 840A. First cylindrical lens assembly 830A may be composed of from one to several individual lens elements combined in a rigid structure. It is even possible to omit lens assembly 830A altogether, which results in a type of pinhole camera. Aperture 820A may be located between or outside the lens elements within cylindrical lens assembly 840A. First cylindrical lens assembly 830A has focusing strength in the y direction but not in the x direction. In other words, first cylindrical lens assembly will tend to focus light in the y direction but leave it unaffected in the x direction. Consequently light entering first cylindrical lens assembly 830A will form line 854A extending in the x direction.

Light source 202 is at coordinates $(x_0, y_0, z_0)$ relative to some global frame of reference within the measurement environment of FIG. 1. Ray of light 314 is split by beam splitter 816. To find the beam images, consider the rays that pass through the optical centers of cylindrical lens assemblies 830A, 830B. The centroids of lines of light 854A, 854B form at approximately $fa_y, fa_x$ where f is the focal length of cylindrical lens assembly 830A and $a_y, a_x$ are the angles in the y, x directions that ray 314 makes with respect to optical axis 310. The actual centroids are at slightly different positions than $fa_y, fa_x$ because of aberrations in the lens system. Correction values are applied to each point to compensate for these aberrations. The correction values are determined through measurements made one time at the factory.

It is important to minimize the amount of background light that illuminates linear photosensitive arrays 840A, 840B. One method of reducing background light has already been discussed—adding optical bandpass filter 814 or coating cylindrical optical lens assembly 830A, 830B to reject unwanted wavelengths. Another method of reducing background light is to synchronize the integration time of linear photosensitive arrays 840A, 840B to correspond to the flashing of light source 202.

Figure 10:
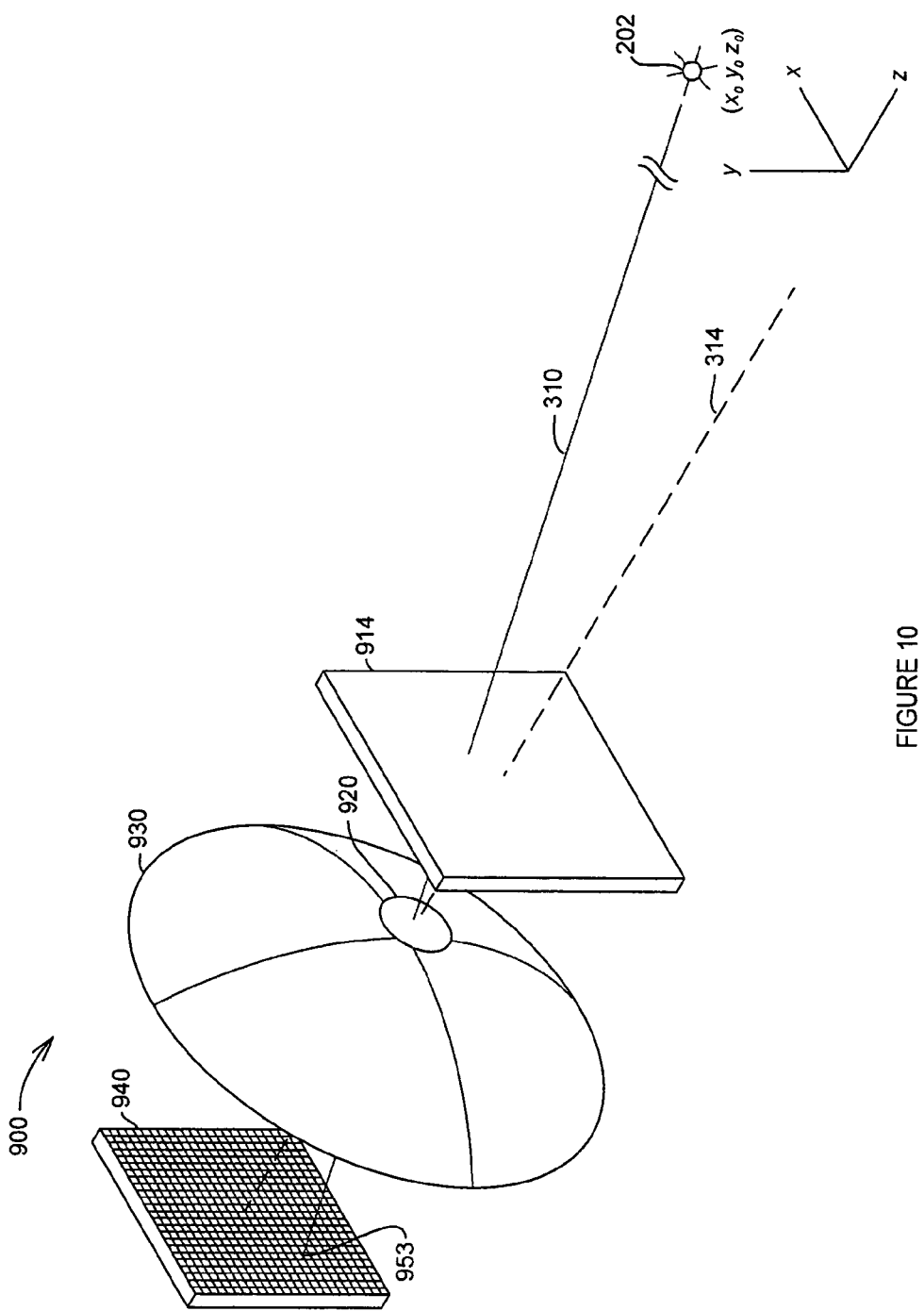
FIG. 10 is a perspective view of a second embodiment of the imaging block within the cameras wherein the images are formed with spherical optics and an area photosensitive array.

The second embodiment of imaging block 410 is area imaging block 900 shown in FIG. 10. Area imaging block 900 comprises optical bandpass filter 914, aperture 920, spherical lens assemblies 930, and area photosensitive array 940. The purpose of optical bandpass filter 914 is to eliminate background light outside the wavelength range of light source 202. This improves the signal-to-noise ratio of photosensitive array 940. An alternative to optical bandpass filter 914 is to coat the surfaces of lens assembly 930 to filter out unwanted wavelengths.

Optical axis 310 goes through the centers of optical bandpass filter 914, aperture 920, spherical lens assembly 930, and area photosensitive array 940. Light ray 314 emerges from source of light 202 and travels to area imaging block 900 as shown in FIG. 10. Aperture 920 permits only some of the light to enter the spherical lens assembly 930. Spherical lens assembly 930 may be composed of from one to several individual lens elements combined in a rigid structure. It is even possible to omit lens system 930 altogether, which results in a pinhole camera. Aperture 920 may be located between or outside the lens elements within spherical lens assembly 940.

Spherical lens assembly 930 has the same focusing strength in the x and y directions. Consequently light entering spherical lens assembly 930 forms a small spot at point 953 on area photosensitive array 940. To find the position of point 953, the ray of light 314 from light source 202 is drawn through the optical center of spherical lens assembly 930. Usually the distance from camera 400A, 400B is much larger than the focal length of the lens systems within the cameras. In this case, the point of light 953 is formed at approximately the focal length f away from the effective center of cylindrical lens system 930. If the center of photosensitive array 940 is at position (x, y)=(0, 0), then point 953 is located on array 930 at approximately the coordinates $(fa_x, fa_y)$, where $a_x, a_y$ are the angles of ray 310 with respect to optical axis 314. The diameter of aperture 920 is set small enough to minimize aberrations without reducing optical power too much.

The position of the centroid of point of light 953 is calculated from the pixel response of area photosensitive array 940. In general, it is necessary to correct this position to account for the effect of optical aberrations. The correction values are determined through measurements made one time at the factory.

It is important to minimize the amount of background light that illuminates area photosensitive array 940. One method of reducing background light has already been discussed—adding optical bandpass filter 914 or coating spherical optical lens assembly 930 to reject unwanted wavelengths. Another method of reducing background light is to synchronize the integration time of area photosensitive array 940 to correspond to the flashing of light source 202.

Electrical block 430 in FIG. 8 comprises conditioner 432 and computing means 434. The main purpose of conditioner 432 is to produce digital signals suitable for processing by computing means 434. If photosensitive array 420 is a CCD array, then conditioner 432 will probably contain an analog-to-digital converter and support circuitry. If photosensitive array 420 is a CMOS array, then conditioner 432 will probably not require an analog-to-digital converter and may contain only a buffer/line-driver. Data is transferred from conditioner 432 to computing means 434, which may contain a digital signal processor (DSP), field-programmable gate array (FPGA), microprocessor, or similar computing device. The purpose of computing means 434 is to process the images on photosensitive array according to the prescription given above—finding the centroid, applying the appropriate correction factors, and performing the best-fit calculations.

Computing interface 500 comprises computing means 510, user interface 520, transceiver 530, and antenna 540. Data is sent from computing means 434 to computing means 510. At the same time, data is sent from the corresponding computing means in camera 400B. These two cameras provide information on the angles to light source 202.

Coordination is required between the pulsing of light source 202, the exposure and reading of data from photosensitive array 840A, 840B, or 940, and the computation by computing means 434 and 510. The timing signals for this coordination may be triggered in one of three ways: (1) by a signal received through antenna 186 or a wire that takes the place of antenna 186, (2) by a signal initiated when the operator presses a button on operator control unit 188, or (3) by a predetermined signal pattern.

Calculations

The objective of three-dimensional coordinate measuring device 100 is to determine the position of the moving emitter 200. This is done in two phases—the resection phase and the intersection phase. In the resection phase, the position and orientation of the cameras is determined. One of the two cameras is taken to be at the origin (x, y, z)=(0, 0, 0) with orientation angles (pitch, roll, and yaw) equal to zero. The position and orientation of the second camera is found by measuring points of light having a known distance between the points. This is done several times with the points located at different distances and positions relative to the cameras. It is necessary to measure points separated by known distances in the resection phase to establish the scale of the camera. This is conveniently done with an artifact made of a low CTE material such as composite material or Invar. Two or more light sources are mounted on the artifact. In the intersection phase, the coordinates of the emitter are determined at the frame rate of the camera as the emitter is moved from point to point.

In both resection and intersection measurements, best-fit mathematics are used to determine the required coordinates and orientations. These mathematical techniques are well known to workers in photogrammetry and surveying. Numerous books and papers have been written on this subject, so further discussion is not given here.

Measurement

Most of the important dimensional characteristics of object 140 can be measured with coordinate measuring device 100. The surface contours of object 140 can be determined by moving spherically mounted light source 210 over the surface of object 140 while light source 214 flashes rapidly at regular intervals. Because light source 214 is located in the center of partial sphere 212, the distance from light source 214 to the surface of object 140 is constant, regardless of the pitch, yaw, or roll angle of spherically mounted light source 210. The constant distance is removed from the coordinate readings to determine the coordinates of the surface. By measuring the surface contour of a flat object, it is possible to determine the flatness of the object—in other words, how much the surface deviates from an ideal plane. By measuring two flat objects, it is possible to determine the angle between the surface planes. By measuring a spherical surface, it is possible to determine the center and diameter of the sphere. Probe-mounted emitter 220 can be used to measure the surface contour of a small object or an object with fine detail.

A convenient method of making measurements over a large footprint (say, 15 meters on a side) is to use wide-angle emitter 240 in combination with multiple fixed cameras each having a wide field-of-view. As wide-angle emitter 240 is moved, it is viewed continually by the cameras. The operator measures on all sides of the object without the need to relocate the cameras or perform additional resection procedures.

It is common practice to place fiducial points on tools used the assembly and characterization of automobiles, airplanes, scientific structures, and similar objects. One use of the fiducial points is to monitor whether the object dimensions change over time. Such dimensional changes may result from mechanical shock or from changes in ambient temperature. One way to establish fiducial points is to drill holes in the object at appropriate locations. Probes, such as tooling ball 160 or fiducial emitter 230, are placed in the hole. Tooling ball 160, shown in FIGS. 1 and 11, comprises sphere 162, crown 164, and shank 166. When shank 166 is placed in a fiducial tooling hole, the center of sphere 162 is a fixed distance above the top of the hole. Spherically mounted light source 210 or probe-mounted light source 220 can be used to measure the contour of sphere 162. From this, the center of the tooling hole can be determined. Fiducial emitter 230 has already been described. Light source 232 is located at the position corresponding to the center of sphere 162. Because of this, the location of the tooling hole can be determined and is not affected by the orientation of fiducial emitter 230 in the tooling hole.

Figure 11:
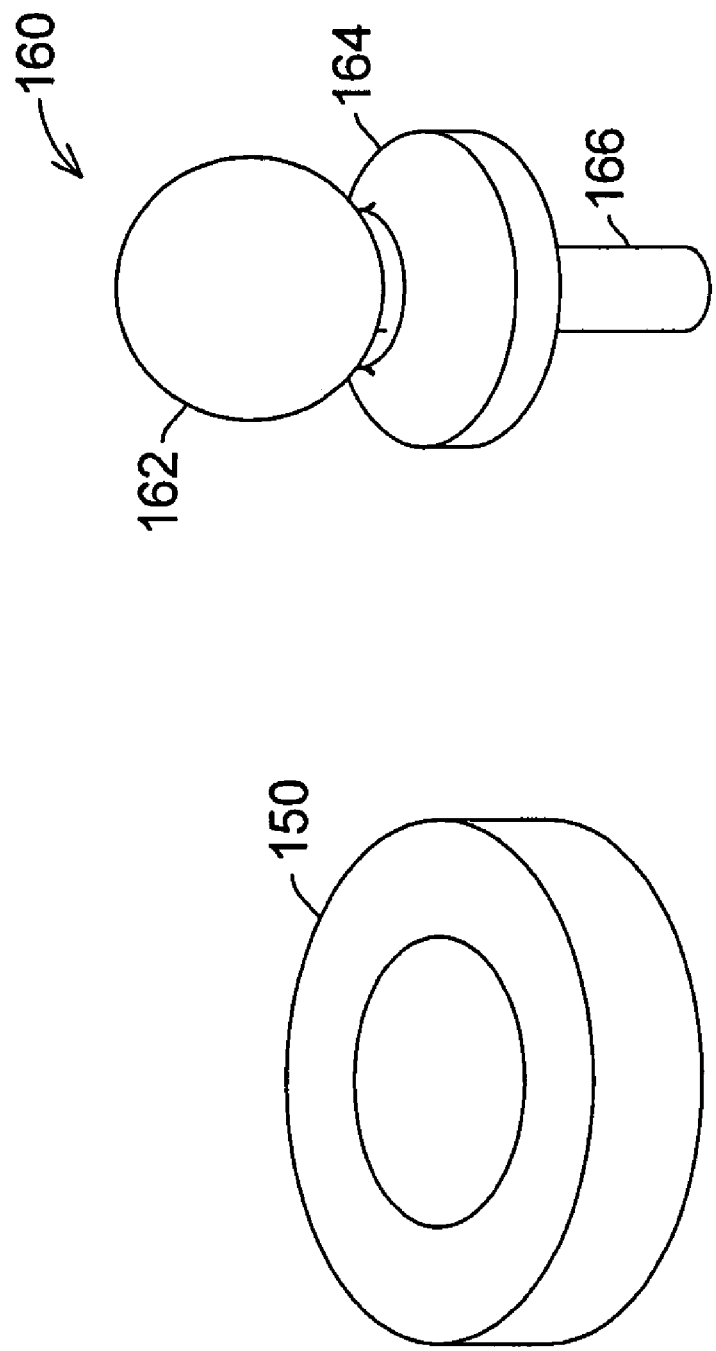
FIG. 11 is a perspective view of a tooling ball and nest.

Another way to establish fiducial points is to attach nests to objects or their surroundings. Magnetic nest 150 is shown in FIGS. 1 and 11. It comprises the nest body (shown in FIG. 11), three spherical point contacts (not shown) within the nest body and a magnet (not shown) within the nest body. A spherical surface, when placed on the three spherical point contacts, can be rotated to any desired pitch, yaw, and roll angles about the center of the sphere. If spherically mounted light source 210 that is made of steel is placed in magnetic nest 150, the magnet within the nest will hold the light source 210 securely in contact with the three spherical point contacts while allowing light source 210 to be rotated to any desired position. Nest 150 can be attached to an object or its surroundings by means such as screws or hot glue.

Sometimes it is necessary to measure a feature that is obscured from the direct view of one or more cameras 400A, 400B. The retroprobe emitter 260 permits probing of such hidden features.

Speed, Accuracy, and Cost

Imaging block 800 provides high speed and accuracy for low cost. Consider a CCD linear array with 5000 pixels and 100% fill factor with a camera having a field-of-view of 50 degrees=0.87 radian. If the subpixel accuracy of the system is 100:1 and the geometry of the cameras produces a reduction in three-dimensional accuracy relative to angular measurements of two, then the expected three-dimensional accuracy is $0.87*2/(5000*100)=3.5$ parts per million, which is as good or better than that available from any other three dimensional measurement system available today. Measurement speed is 10,000 Hz, which is higher than most measurement systems available today.

Area imaging block 900 also provides high speed and accuracy for low cost. Consider a CCD linear array with 1000 pixels and 100% fill factor with a camera having a field-of-view of 50 degrees=0.87 radian. If the subpixel accuracy of the system is 200:1 and the geometry of the cameras produces a reduction in three-dimensional accuracy relative to angular measurements of two, then the expected three-dimensional accuracy is 0.87*2/(1000*200)=8.7 parts per million, which comparable to the best three-dimensional portable coordinate-measuring machines available today. Measurement speed is about 100 Hz, which is sufficient for almost all applications as long as the light is flashed to freeze the motion of a moving emitter.

Of course, there are many ways to construct the claimed displays using the principles taught herein. The specific embodiments we describe are only a few among the set of all possible constructions that fall within the scope of the claims.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An optical camera three-dimensional coordinate measuring system for use with objects to be measured comprising:
   a compact, easily moveable, and rotatable, target of known dimensions comprising a spherical surface to be placed in direct contact with the object to be measured at different points along the object to be measured thereby eliminating the necessity of using a larger extended probe contact tip extending from the target to the object to be measured;
   at least one or more light emitting source located in a known position in the target and wherein the light emitting source is located at the spherical center of the target having a spherical surface;
   at least two cameras located at different and known coordinate locations for receiving light from the light emitting source from different optical perspectives; and
   a processor for computing the position in three dimensional coordinates of the object to be measured from images of the light emitting source on the cameras, from the known positions of the cameras, from the known dimensions of the target, and from the known position of the light emitting source in the target.

2. The system of claim 1 wherein the target comprises a light transmissive sphere illuminated by the light source and coated with a partially reflective coating and located inside a second light transmissive sphere.

3. The system of claim 1 wherein the target has a handle attached to the target.

4. The system of claim 1 wherein the spherical surface is placed in contact with the object to be measured; and further comprising a light source placed in relation to a mirror such that the center of the spherical surface is located at the virtual image position of the light source in the target.

5. The system of claim 1 wherein the target is a partial sphere open on at least one side.

6. The system of claim 1 wherein the at least two cameras each include at least one or more photosensitive arrays which are used to determine three dimensional coordinates of the object to be measured from images of the light emitting source recorded on the photosensitive arrays that the light from the light emitting source is incident upon.

7. A Coordinate Measurement Machine (CMM) for use with objects to be measured comprising:
   a spherical or cylindrical shaped geometric target of known dimensions to be placed in contact with the object to be measured at different points along the object to be measured;
   at least one or more light emitting diode (LED) light source located at a point of symmetry on the spherical or cylindrical shaped geometric target;
   at least two photosensitive cameras located at different and known coordinate locations for receiving light from the light emitting diode (LED) light source from different optical perspectives;
   a processor for computing the position in three dimensional coordinates of the object to be measured from images of the light emitting diode (LED) light source recorded on the cameras, from the known positions of the cameras, from the known dimensions of the spherical or cylindrical shaped geometric target, and from the known position of the light emitting source located in the spherical or cylindrical geometric target;
   wherein the at least two cameras each include at least one or more photosensitive arrays which are used to determine coordinates of the object to be measured from the recorded images of the light emitting diode (LED) light source on the photosensitive arrays that the light from light emitting diode (LED) light source is incident upon.

8. The machine of claim 7 wherein the light emitting diode (LED) light source is located along the axis of a target having cylindrical symmetry and wherein a portion of the target is structured to fit into a hole of specified diameter in the object to be measured.

9. The machine of claim 7 wherein the light emitting diode (LED) light source is located at the spherical center of the target having a spherical surface.

10. The machine of claim 7 wherein the target comprises a partially light transmissive sphere illuminated by light emitting diode (LED) light source and coated with a partially reflective coating and located inside a second light transmissive sphere.

11. The machine of claim 7 wherein the target has a handle attached to the target.

12. The machine of claim 7 wherein a spherical surface is placed in contact with the object to be measured; and further comprising a light source placed in relation to a mirror such that the center of the spherical surface is located at the virtual image position of the light source in the target.

13. The machine of claim 7 wherein the target is a partial sphere open on at least one side.

14. An optical camera three-dimensional coordinate measuring method for measuring objects comprising:
   placing a compact, easily moveable, and rotatable, target of known dimensions comprising a spherical surface in direct contact with the object to be measured at different points along the object to be measured thereby eliminating the necessity of using a larger extended probe contact tip extending from the target to the object to be measured;

emitting light from the target from at least one or more light emitting source located in a known position in the target;

recording images of the light source at least two cameras located at different and known coordinate locations for receiving light from the light emitting source from different optical perspectives; and computing the position in three dimensional coordinates of the object to be measured from images of the light emitting source on the cameras, from the known positions of the cameras, from the known dimensions of the target, and from the known position of the light emitting source in the target.

15. The method of claim 14 wherein the light emitting source is located at the spherical center of the target having a spherical surface.

16. The method of claim 15 wherein the target comprises a light transmissive sphere illuminated by the light source and coated with a partially reflective coating and located inside a second light transmissive sphere.

17. The method of claim 15 wherein the spherical surface is placed in contact with the object to be measured; and further comprising a light source placed in relation to a mirror such that the center of the spherical surface is located at the virtual image position of the light source in the target.

18. The method of claim 15 wherein the target is a partial sphere open on at least one side.

19. An optical camera three-dimensional coordinate measuring system for use with objects to be measured comprising:

a compact, easily moveable, and rotatable target of known dimensions comprising a cylindrical surface to be placed in at least one or more holes in the object to be measured thereby eliminating the necessity of using a larger extended probe contact tip extending from the target to the object to be measured;

at least one or more light emitting sources wherein the light emitting source is located at a known position on the target along an axis of cylindrical symmetry;

at least two cameras located at different and known coordinate locations for receiving light from the light emitting source from different optical perspectives; and a processor for computing the position in three dimensional coordinates of the object to be measured from images of the light emitting source on the cameras, from the known positions of the cameras, from the known dimensions of the target, and from the known position of the light emitting source in the target.

* * * * *